United States Patent

Houng et al.

Patent Number: 5,445,089
Date of Patent: Aug. 29, 1995

[54] SEEDLINGS TRANSPLANTING MACHINE

[76] Inventors: Chong L. Houng; Po-Ching Wang; Lu Kuei-Lin, all of No. 11, Lane 23, Ching-Li Street, Tucheng city, Taipei, Taiwan; Tingzong Sun, No. 114, Stalin Blvd., Changchun, Jilin Province, China; Yunxiang Fan, No. 114, Stalin Blvd., Changchun, Jilin Province, China; Ziwan Yang, No. 114, Stalin Blvd., Changchun, Jilin Province, China; Xiourong Wang, No. 114, Stalin Blvd., Changchun, Jilin Province, China

[21] Appl. No.: 281,188

[22] Filed: Jul. 27, 1994

[51] Int. Cl.[6] .............................................. A01C 11/02
[52] U.S. Cl. ...................................... 111/105; 47/1.01; 47/901
[58] Field of Search ................ 47/1.01, 901; 111/105, 111/115, 117, 100, 101, 104, 106, 919

[56] References Cited

U.S. PATENT DOCUMENTS

| | | | |
|---|---|---|---|
| 3,712,252 | 1/1973 | Huang | 111/105 |
| 4,290,373 | 9/1981 | Boots et al. | 111/105 |
| 4,947,579 | 8/1990 | Harrison et al. | 47/1.01 |
| 5,048,434 | 9/1991 | Forster et al. | 111/105 |
| 5,209,170 | 5/1993 | Kobayashi | 111/105 |
| 5,353,723 | 10/1994 | Tesch, Jr. et al. | 111/105 |
| 5,365,693 | 11/1994 | Van Wingerden et al. | 111/105 X |

Primary Examiner—Randolph A. Reese
Assistant Examiner—Robert Pezzuto
Attorney, Agent, or Firm—Shoemaker and Mattare Ltd.

[57] ABSTRACT

A seedlings transplanting machine, which includes a machine base having a platform at the top and a rail transversely disposed above platform and reciprocated longitudinally, a sliding frame placed on the platform and reciprocated along the rail to carry a seedling tray, a first transmission mechanism controlled to move the sliding frame along the rail, a second transmission mechanism controlled to reciprocate the rail longitudinally, a seedling drop unit controlled to draw seedlings away from the tray and then to plant the seedlings in the soil.

7 Claims, 8 Drawing Sheets

SEEDLINGS TRANSPLANTING MACHINE

BACKGROUND OF THE INVENTION

The present invention relates to agricultural machinery, and relates more particularly to a transplanting machine suitable for use in farm lands as well as greenhouses for transplanting seedlings.

Various agricultural machinery and farm implements are known and intensively used for different purposes. These machinery and implements greatly help farmers increase the yield, however these machinery and implements are commonly expensive. Because conventional agricultural machinery and farm implements are designed for different purposes, farmers may have to prepare various machines. For example, for raising rices, a farmer may have to prepare plows, rolls, seed drills, transplanting machines, etc. Furthermore, conventional transplanting machines are specifically designed for transplanting seedlings in the paddy field. They are not applicable for use in greenhouses.

SUMMARY OF THE INVENTION

The present invention has been accomplished under the circumstances in view. According to one aspect of the present invention, the seedlings transplanting machine comprises seedling tray having pots for sowing seeds, wherein the inner diameter of the each seedling pot gradually increases toward the bottom. According to another aspect of the present invention, a sliding frame is mounted on a platform above the machine base of the seedlings transplanting machine and driven to move the seedling tray transversely as well as longitudinally. According to still another aspect of the present invention, the seedlings transplanting machine comprises a seedlings drop unit which produces a vacuum to draw seedlings with the media away from the seedling tray and then to plant them in the soil or flower pots. According to still another aspect of the present invention, a microprocessor-operated controller is provided and installed in the seedlings transplanting machine to control the operation automatically.

DETAILED DESCRIPTION OF THE PREFERRED EMBODIMENTS

Referring to the annexed drawings in detail, a seedlings transplanting machine in accordance with the present invention is generally comprised of a seedling tray, two transmission mechanisms, a seedling drop unit, and a tillage mechanism.

Figures 1A, 1B:
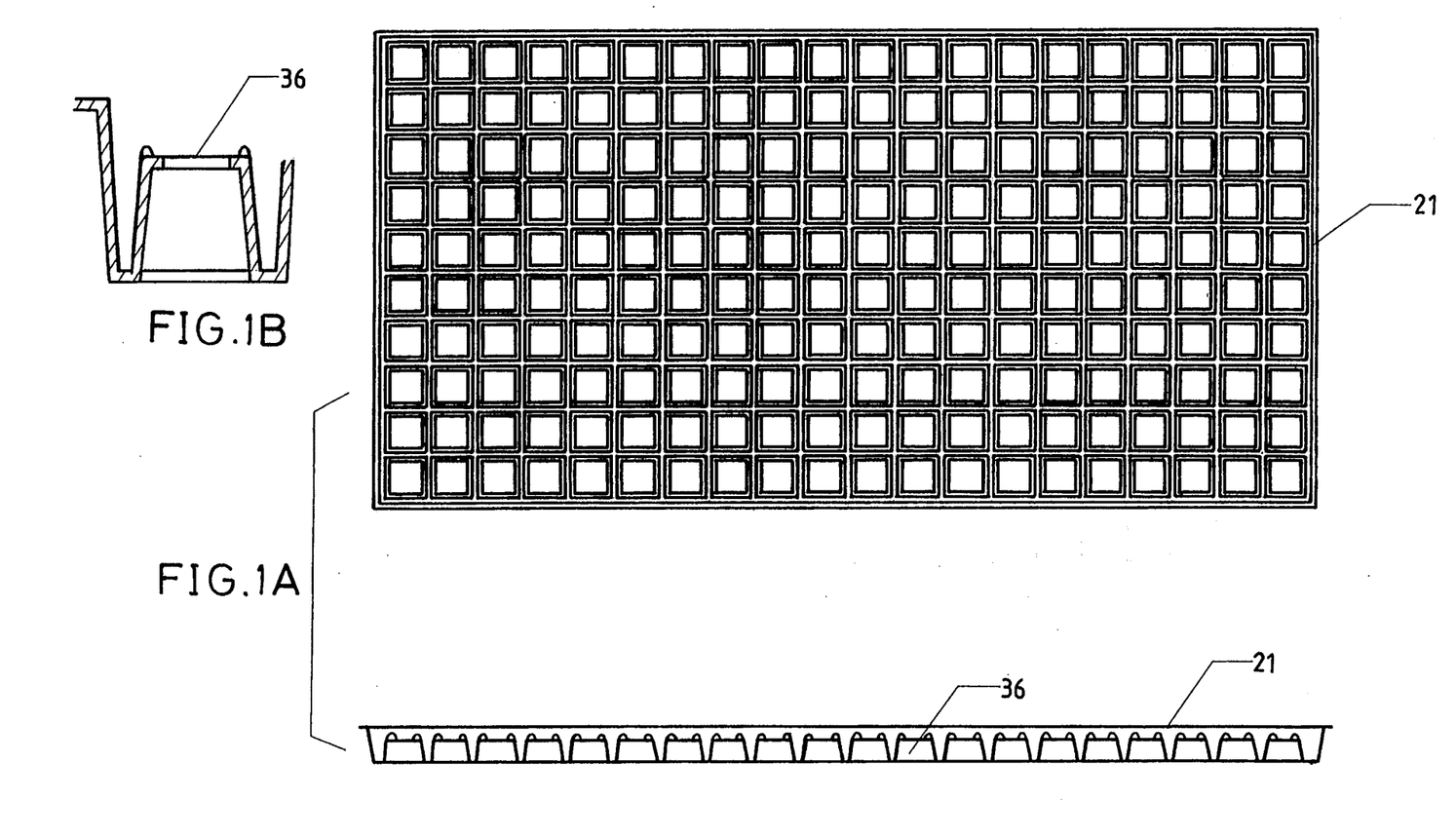
FIG. 1A shows the structure of a seedling tray according to the present invention.
FIG. 1B shows a cross-sectional view of a pot of the seedling tray.

The seedling tray, referenced by 21, is mounted on a sliding frame 51, which is made to slide on a platform 22 above the machine base 1. Seedling tray 21 has a plurality of pots 36 integrally formed together, as shown in FIGS. 1A and 1B. The seedling drop unit 19 is mounted on the platform 22 at the bottom. The sliding frame 51 is moved by the transmission mechanisms through the control of a microprocessor-operated controller 23. The seedling tray 21 comprises rows of seedling pots 36 aligned longitudinally as well as transversely to hold seedlings 20. Each seedling pot 36 has both ends open. The seedling drop unit 19 comprises a mounting frame 37, a planting tube 43, a fixed piston 41, a movable sleeve 40, a bottom cover 45, and a door of fabrics 44. The mounting frame 37 is fixedly fastened to the platform 22 at the bottom. The planting tube 43 has a top end inserted through a hole 37A on the mounting frame 37 and fixedly mounted within a hole 22A on the platform 22. The fixed piston 41 fits into the movable sleeve 40 and fixedly mounted around the planting tube 43. The bottom cover 45 covered on the movable sleeve 40 at the bottom defining a variable air chamber with the bottom surface of the fixed piston 41. The bottom cover 45 has a center opening 45A of diameter slightly bigger than the outer diameter of the planting tube 43. The door of fabrics 44 is mounted on the bottom cover 45 to control the passage through the center opening 45A of the bottom cover 45. Furthermore, the movable sleeve 40 of the seedling drop unit 19 has mounting lugs 40A for connection to a accelerating lever mechanism (this will be described further).

The two transmission mechanisms are respectively mounted on the platform 22 at both sides. The platform 22 comprises a rail 12 transversely disposed at the top. The first transmission mechanism which consists of a reversible motor 2, an electromagnetic clutch 3, a transmission gear box 4, a screw rod 6 and a screw nut 5 is mounted on the rail 12. The screw nut 5 is fastened to the sliding frame 51. The second transmission mechanism which consists of a reversible motor 8, an electromagnetic clutch 9, a transmission gear box 10, two screw rods 15 and two screw nuts 14 is mounted on the platform 22 at the bottom. The transmission gear box 10 includes a transmission rod 11 extending from the transmission gear box 10 and disposed in parallel with the platform 22. The two screw rods 15 are disposed in parallel at two opposite sides and respectively connected to the transmission rod 11 at right angles by bevel gears 13. The screw nuts 14 are respectively threaded onto the screw rods 15. The aforesaid rail 12 is mounted on the screw nuts 14.

The reversible motors 2 and 8 are controlled by the microprocessor-operated controller 23 to turn in either direction causing the electromagnetic clutches 3 and 9 to move into a connected or a disconnected position. When the reversible motors 2 and 8 rotate in one direction and the electromagnetic clutches 3 and 9 are moved into the connected position, the screw rods 6 and 15 are turned in one direction causing the screw nuts 5 and 14 to move the sliding frame 51 and the seedling tray 21 in one direction step by step (pot by pot). When the reversible motors 2 and 8 rotate in a reversed direction, the electromagnetic clutches 3 and 9 are moved into the connected position, the screw rods 6 and 15 are turned in the reversed direction causing the nuts 5 and 14 to move the sliding frame 5 in the reversed direction step by step (pot by pot). The first transmission mechanism controls the sliding frame 51 and the seedling tray 21 to move in the transverse direction. The second transmission mechanism controls the sliding frame 51 and the seedling 21 to move in the longitudinal direction. The first and second transmission mechanisms are controlled by the microprocessor-operated controller 23 to move transversely or longitudinally in either direction step by step (pot by pot) so that the seedling pots 36 are alternatively aligned with the center opening 45A of the seedling drop unit 19 for planting seedlings 20.

Figure 4:
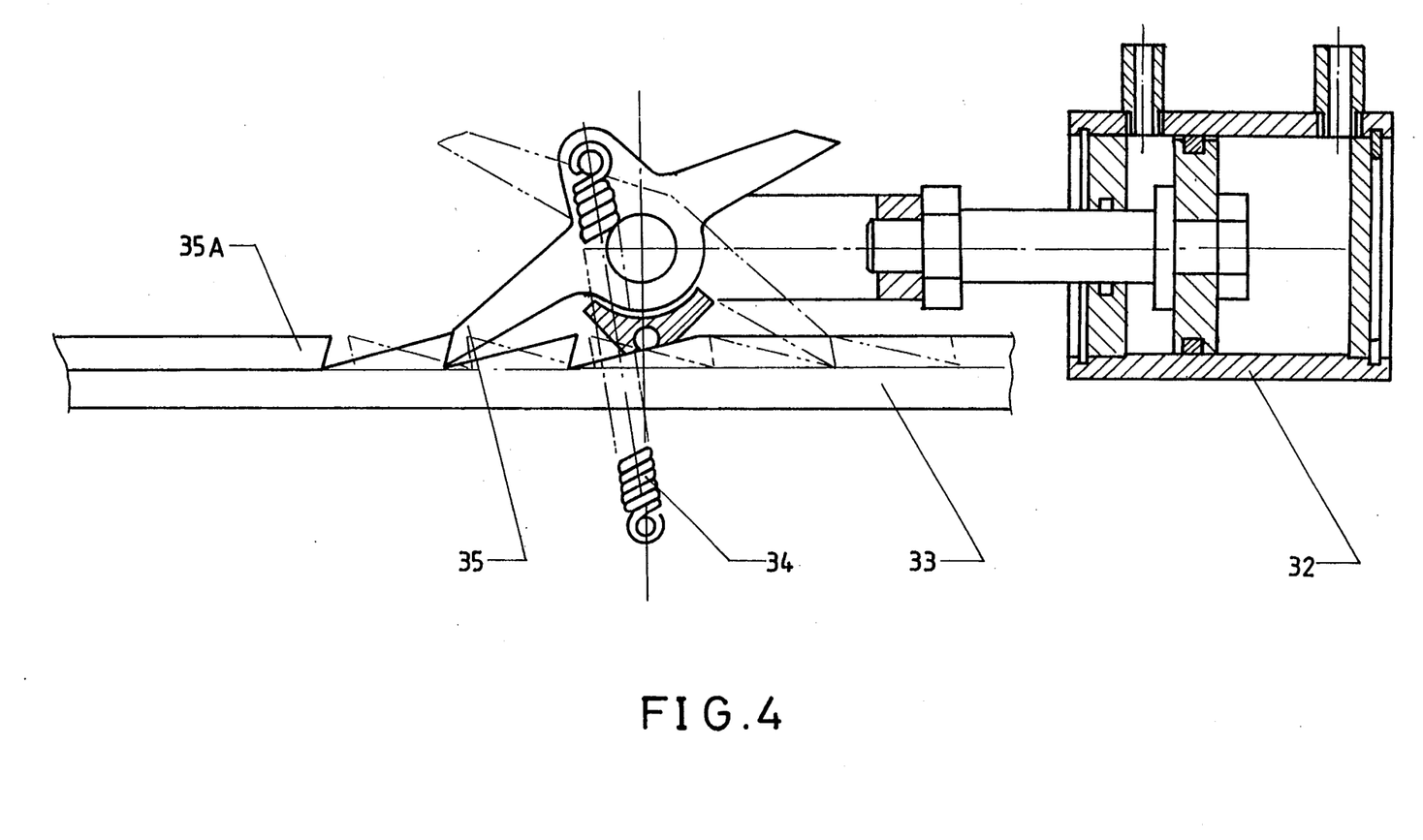
FIG. 4 shows an alternate form of the transmission mechanism for the seedling transplanting machine shown in FIG. 2.

As an alternate form of the present invention, the transmission mechanism may comprises a pneumatic cylinder 32, a two-way rack 33, a spring 34, and a pawl 35. The two-way rack 33 is fixedly mounted on the sliding frame 51. The pawl 35 is fastened to the piston rod of the cylinder 32 and engaged with the two-way rack 33. The spring 34 has one end fastened to the pawl 35 and an opposite end fastened to a platform 22. Two stop frames 35A are mounted at two opposite locations to limit the moving range of the pawl 35. When the piston rod of the cylinder 32 is reciprocated, the pawl 35 is forced to push the rack 33 causing the sliding frame 51 moved forwards. When the sliding frame 51 is moved to the limit position at one end, the pawl 35 is forced by the respective stop frame 35A to change the angle, and therefore the sliding frame 51 is moved in the reversed direction by the pawl 35 through the rack 33. Similarly, two transmission mechanism must be installed so that the sliding frame 51 can be moved reciprocatorily longitudinally as well as transversely.

Figure 5:
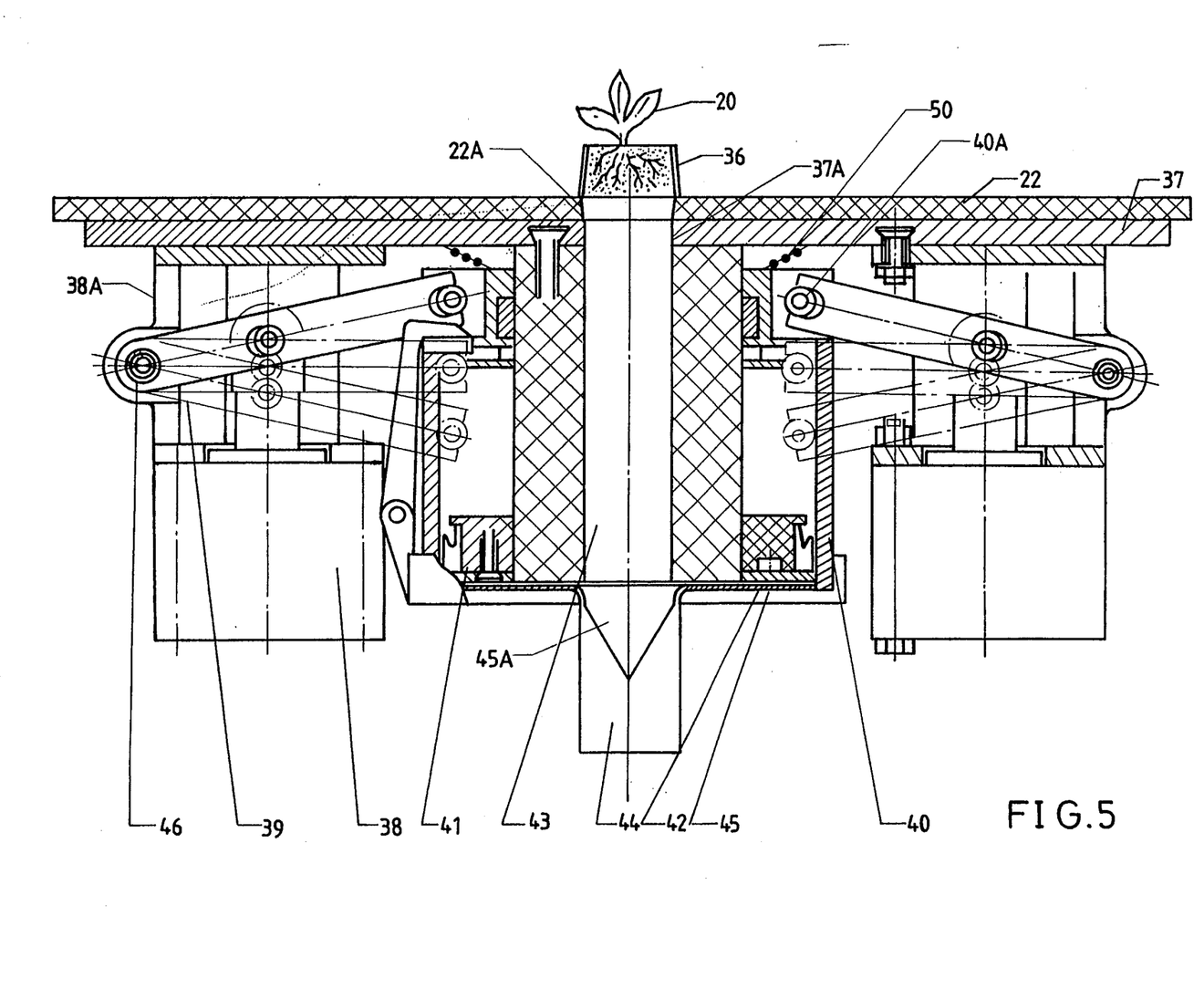
FIG. 5 shows the seedling drop unit and the arrangement of the accelerating lever mechanism according to the present invention.
Figure 6:
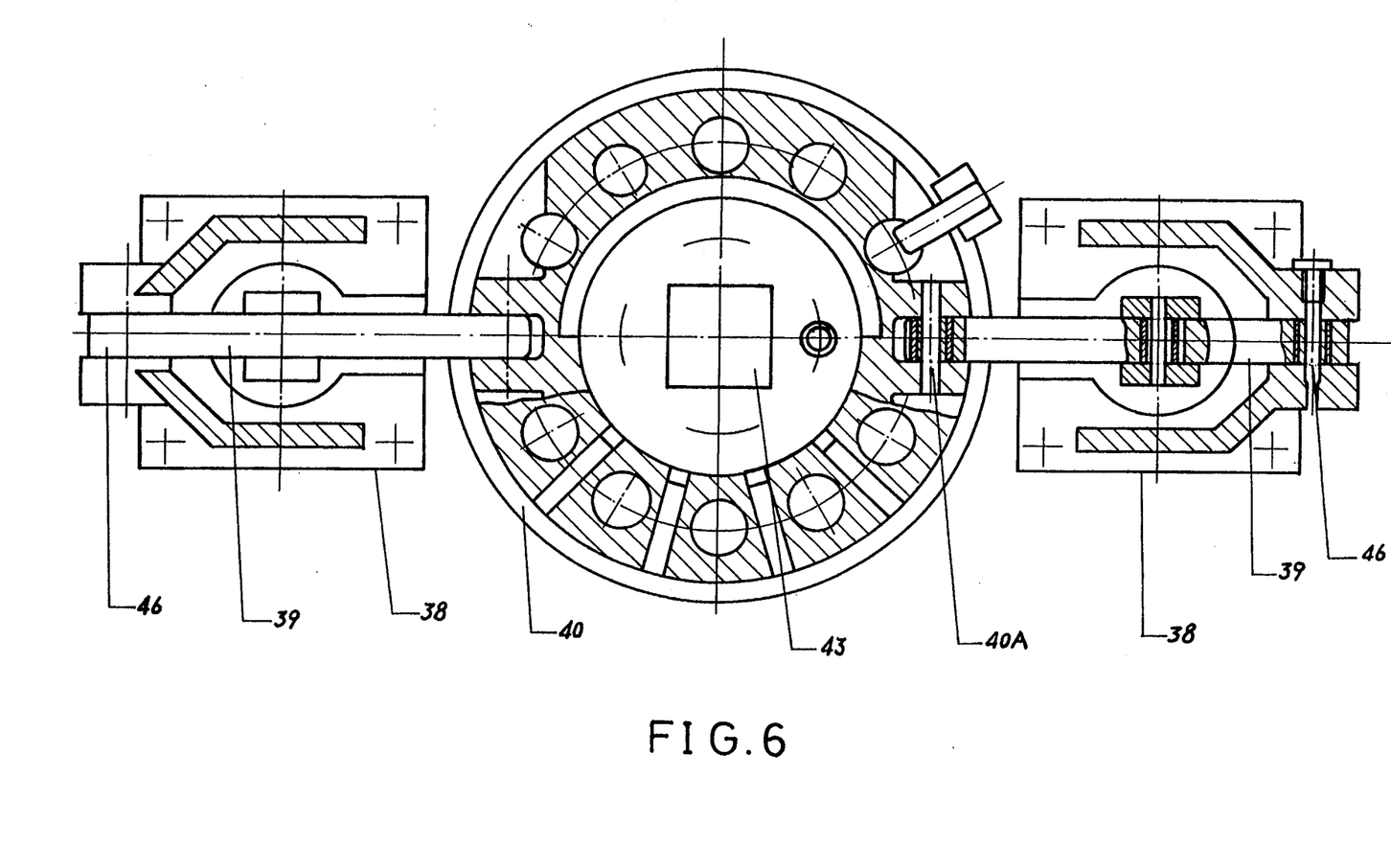
FIG. 6 is a top view in plain of FIG. 5.
Figure 7:
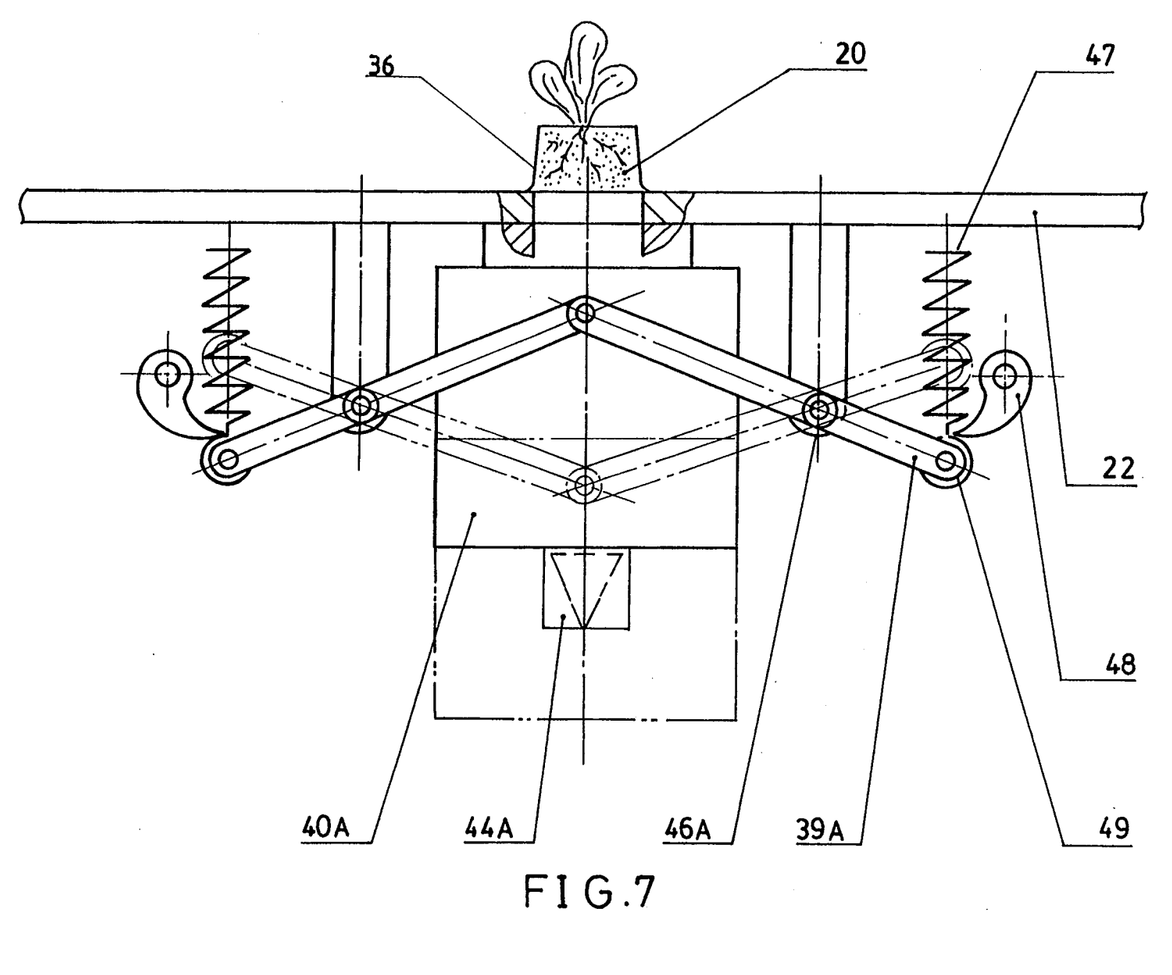
FIG. 7 shows the installation of cam and spring sets driven to reciprocate the movable sleeve of the seedling drop unit according to the present invention.

Referring to FIGS. 5 and 7, seedling drop unit 19 is provided with an accelerating lever mechanism including a pneumatic cylinder 38 and a lever 39. Cylinder 38 is mounted on two sides of a movable sleeve 40 and fixed on a mounting frame 37. Movable sleeve 40 has a mounting lug 40A, and lever 39 has one end connected to the mounting lug 40A of the movable sleeve 40, another end connected to piston rod of pneumatic cylinder 38. Piston moves reciprocatingly within cylinder 38. The accelerating levers 39 each has one end pivotally mounted on to a bracket 38A with fulcrm 46, bracket 38A being adapted to mount cylinder 38 onto mounting frame 37. A leaf spring 50 is disposed between movable sleeve 40 and mounting frame 37 to urge movable sleeve 40 downwards. Alternatively, a cam and spring set may be used to replace the aforesaid pneumatic cylinder 38. The cam and spring set comprises a cam 48 and a spring 47. The spring 47 has one end fixedly fastened to the platform 22 at the bottom and an opposite end fastened to the top end (the end of effort) of the lever 39A. The top end of the lever 39A is mounted with a roller 49. The cam 48 matches with the roller 49. The rotation of the cam 48 can be achieved by means of the operation of a motor or any suitable mechanical power drive.

When the pneumatic cylinders 38 are operated, the levers 39 are oscillated on the the fulcrums 46 respectively, causing the cylinder sleeve 40 reciprocated vertically. At the same time the tapered spring 50 relaxes and helps the cylinder sleeve 40 moving down quicker. When the cylinder 40 is moving downwards, the volume of the variable air chamber 42 is relatively increased, causing the door of fabrics 44 closed, and therefore a vacuum is produced in the planting tube 43. When a vacuum is produced in the planting tube 43, the seedlings 20 with the medium (fertilized soil) are sucked into the planting tube 43 from one seedling pot 36 of the tray 21. As the seedlings 20 are sucked into the planting tube 43 from one seedling pot 36, the negative pressure in the planting tube 43 is simultaneously reduced, causing the door of fabrics 44 opened again for letting the seedlings 20 to pass, and therefore the seedlings 20 are planted in a groove in the paddy field.

Besides the pneumatic cylinder,-a cam-and-spring mechanism may be used to operate the seedling drop mechanism.

When the cam and spring set is used, the operation is outlined hereinafter. When the cam 48 is turned by a motor or any mechanical power drive, the roller 49 is moved to stretch the spring 47. As the crest of the cam 48 passes over the roller 49, the spring 47 immediately returns to its former shape causing the lever 39A turned to move the cylinder 40A downwards, and therefore the seedlings 20 are drawn out of the respective seedling pot 36 and the planting tube 43 and put in a groove in the paddy field.

Besides the above described cylinder and spring-and-cam mechanism, an electromagnetic device may be employed to drive the seedling drop unit 19. Because an electromagnet can be rapidly energized and released, a vacuum can be more efficiently produced in the planting tube 43. Therefore, this alternate arrangement is particularly suitable for a greenhouse transplanting machine constructed according to the present invention.

As the movable sleeve 40 of the seedling drop unit 19 is reciprocated through first-order levers, the structure of the seedling drop unit 19 is simple, and no soil will be sucked in the variable air chamber within the movable sleeve 40. Therefore, the seedling drop unit 19 achieves an accurate planting operation. Because the moving parts of the seedlings transplanting machine are controlled by the microprocessor-operated controller 23, the operation of the seedlings transplanting machine is easy. Therefore, the seedlings transplanting machine of the present invention is suitable for transplanting a variety of seedlings in greenhouses as well as farm lands.

Figure 2:
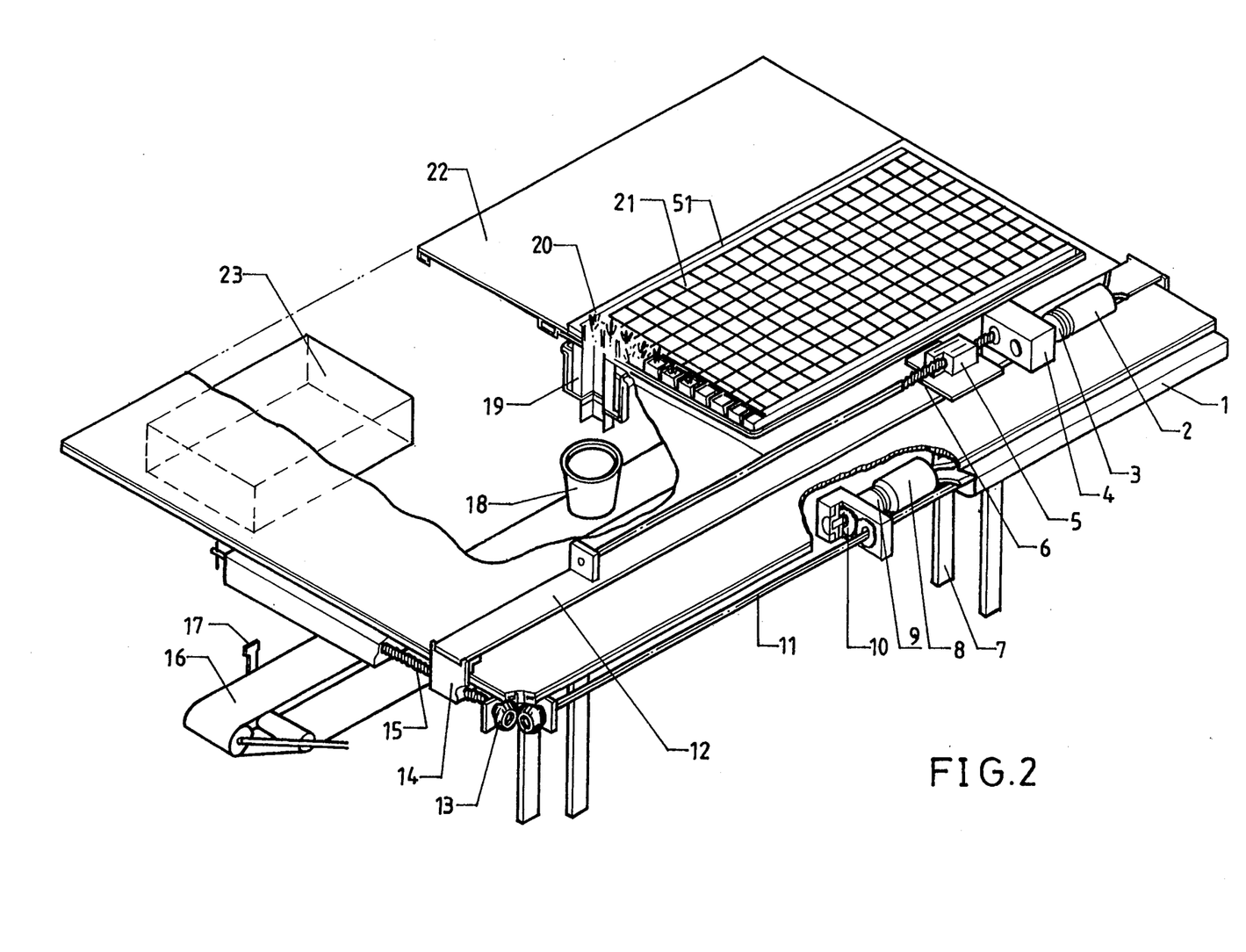
FIG. 2 is a perspective view of a seedlings transplanting machine for use in greenhouses according to the present invention.

FIG. 2 shows a seedlings transplanting machine suitable for use in greenhouses. The platform 22 is supported on upright supports 7. The seedling tray 21 is carried on the sliding frame 51, having rows of seedling pots 36 aligned longitudinally as well as transversely. Each seedling pot 36 has both ends open. The inner diameter of the each seedling pot 36 gradually increases toward the bottom. The seedling drop unit 19 is mounted on the platform 22 at the bottom. Two transmission mechanisms are mounted on the platform 22 at both sides. The first transmission mechanism which is mounted on the platform 22 at the top controls the movement of the sliding frame 51 in the transverse direction, comprised of a reversible motor 2, a transmission gear box 4, an electromagnetic clutch 3, a screw rod 6 and a screw nut 5. The second transmission mechanism which is mounted on the platform 22 at the bottom controls the movement of the sliding frame 51 in the longitudinal direction, a reversible motor 8, a transmission gear box 4 having a transmission rod 11, an electromagnetic clutch 9, two screw rods 6 respectively coupled to either end of the transmission rod 11 by bevel gears 13, and two screw nuts respectively threaded onto the screw rods 6 and fixedly fastened to either end of a rail 12. The rail 12 is mounted on the platform 22 at the top in the transverse direction. The first transmission mechanism is controlled to reciprocate the sliding frame 51 along the rail 12. The first and second transmission mechanisms are controlled by a microprocessor-operated controller 23, which is mounted on the platform 22 at the bottom. The reference number 16 indicates a belt conveyer 16 spaced from the seedling drop unit 19 at the bottom. The reference number 18 indicates a flower pot. There are provided two photoelectric sensors 17, one for detecting the moving speed of the flower pot 18 on the belt conveyer 16, the other for controlling the seedling drop unit 19 to draw seedlings 20 from the seedling tray 21 into the flower pot 18. Any suitable power drive such as pneumatic cylinders, cam and spring sets, electromagnetic solenoid, etc. can be used to drive the seedling drop unit 19. Either single power source or dual-power source may be employed.

Figure 3:
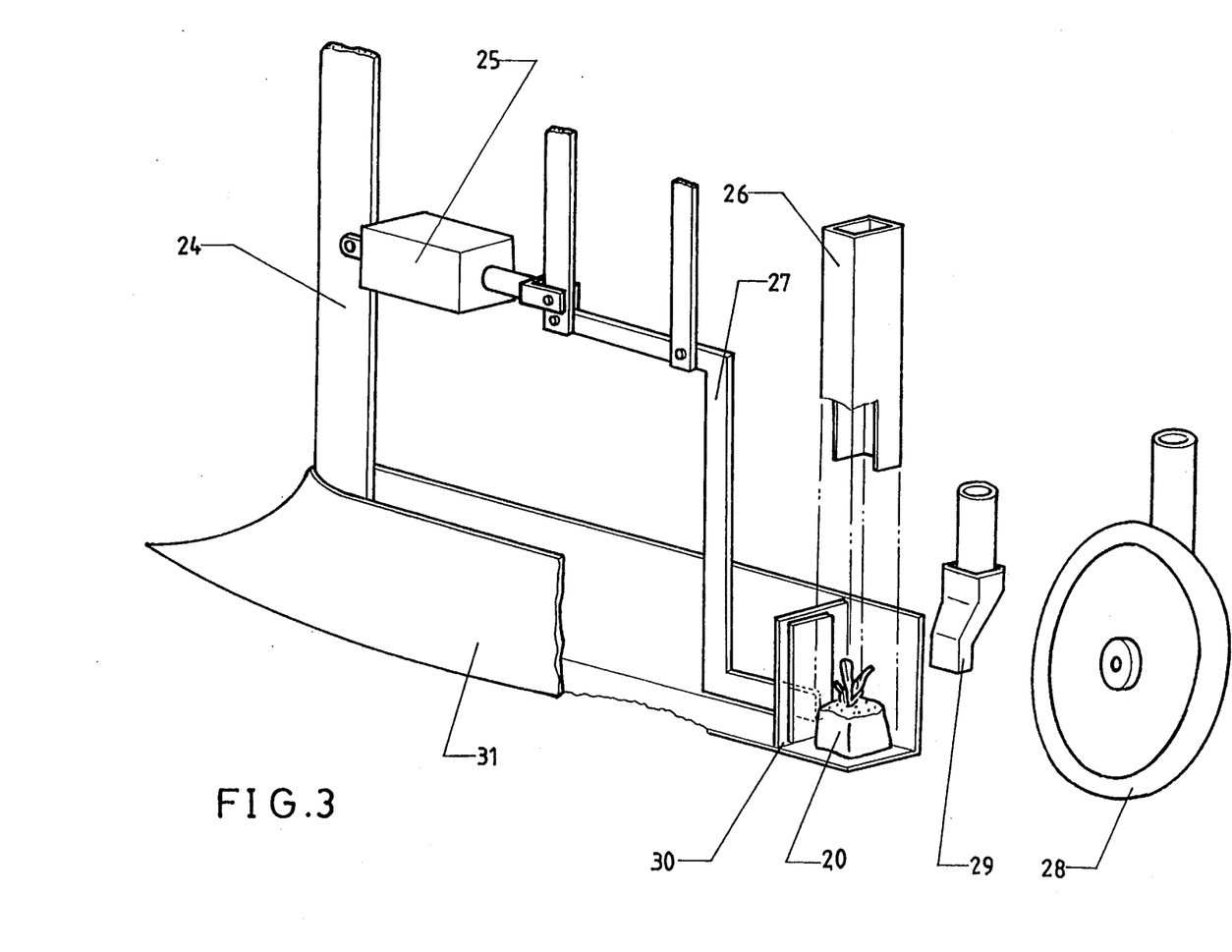
FIG. 3 shows the structure of a tillage mechanism for a seedlings transplanting machine according to the present invention.

The aforesaid seedlings transplanting machine can be used for working in farm lands when a tillage mechanism is installed. FIG. 3 illustrates a tillage mechanism according to the present invention. The tillage mechanism comprises a opener 31, a seedling pusher 30, a water sprayer 29, and packing wheels 28. The opener 31 is fastened to the machine base by a supporting frame 24. When seedlings 20 are drawn into the planting tube 43 they are immediately guided out of the planting tube 43 to a bottom plate of the opener 31 by a guide tube 26. At the same time, the cylinder 25 which is mounted on the supporting frame 24 is turned on to drive the seedling pusher 30 through a four-bar linkage 27, causing the seedling pusher 30 to push the seedlings out of the opener 31 into the groove being duly made by the opener 31 in the field.

A seedlings transplanting machine for use in farm land must include a hitch or coupling so that it can be coupled to a farm tractor.

Figure 8:
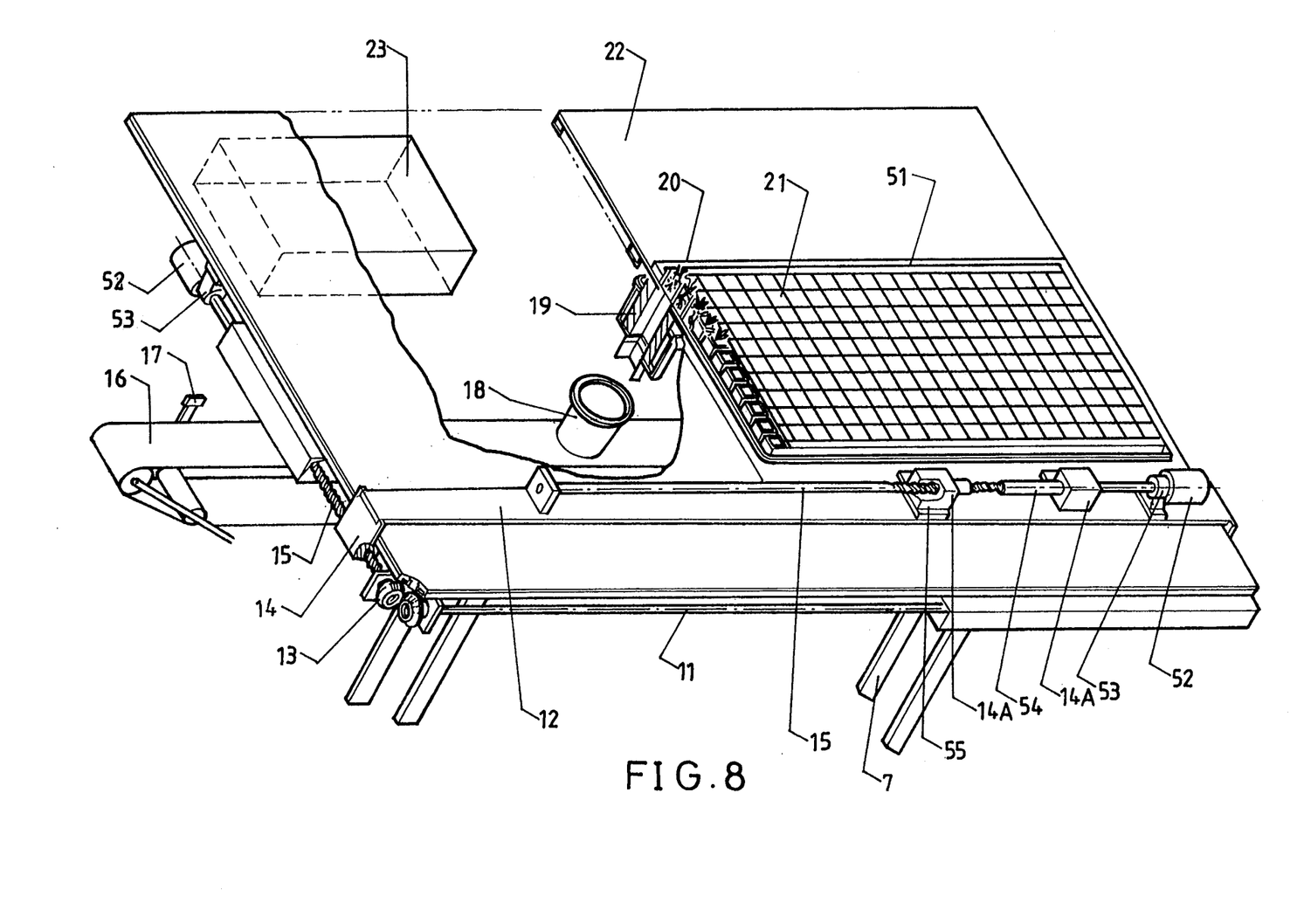
FIG. 8 shows an alternate form of the seedlings transplanting machine according to the present invention.

FIG. 8 shows an alternate form of the seedlings transplanting machine for use in greenhouses. This alternate form uses a step motor 52 to drive the screw rod(s) 15. The output shaft of the step motor 52 is supported on a bearing block 53 and coupled to the screw rod(s) 15. When the screw rod(s) 15 is (are) rotated, the screw nut(s) 14 is (are) moved to carry the sliding frame 51 transversely or longitudinally. The transmission mechanism for controlling the transverse movement of the sliding frame 51 includes two screw nuts 14A connected together by a connecting tube 54, of which one has a steering guide 55 which keeps the screw nut 14 moved along the rail 12o The other parts of the seedlings transplanting machine are remained identical relative to what is shown in FIG. 2.

Pneumatic cylinders 38 may be substituted by hydraulic cylinders as desired.

What is claimed is:

1. A seedlings transplanting machine comprising:
   a machine base having a platform at the top and a rail transversely disposed above said platform and reciprocated longitudinally;
   a sliding frame placed on said platform and reciprocated along said rail;
   a tray carried on said sliding frame;
   a microprocessor-operated controller mounted on said machine base;
   a first transmission mechanism controlled by said microprocessor-operated controller to move said sliding frame along said rail;
   a second transmission mechanism controlled by said microprocessor-operated controller to reciprocate said rail longitudinally;
   a seedling drop unit mounted on said machine base below said platform and controlled by said microprocessor-operated controller to draw seedlings away from said tray through a hole on said platform, permitting the seedlings to be planted in field or guided to predetermined places, said seedling drop unit comprising a mounting frame fixedly fastened to said platform at the bottom, a planting tube having a top end inserted through a hole on said mounting frame and fixedly mounted within a hole on said platform, a fixed piston fixedly mounted around said planting tube at the bottom, a movable sleeve fitting around said fixed piston and reciprocated vertically, a bottom cover covered on said movable sleeve and defining with said fixed piston a variable suction chamber, said bottom cover having a center opening of diameter bigger than the outer diameter of said planting tube, a door of fabrics controlled to open and close the center opening of said bottom cover, and a movable sleeve driving mechanism controlled to reciprocate said movable sleeve causing a vacuum produced to draw seedlings away from said tray, a seedlings transplanting machine of claim 1, further including
   a tillage mechanism mounted on said machine base and controlled by said microprocessor-operated controller, said tillage mechanism comprised of a opener controlled to plow the soil, a seedling pusher controlled to push seedlings out of said opener to the groove on the soil worked by said opener, a water sprayer controlled to spray water over the planted seedlings, and packing wheels controlled to pack the soil.

2. The seedlings transplanting machine of claim 1 wherein said first transmission mechanism is mounted on said rail, comprised of a motor, a transmission gear box, an electromagnetic clutch controlled to coupled said motor and said transmission gear box, a screw rod turned by said motor through said transmission gear box, a screw nut threaded onto said screw rod and fixedly fastened to said sliding frame, said sliding frame being carried by said screw nut to move along said rail when said screw rod is turned by said motor through said transmission gear box.

3. The seedlings transplanting machine of claim 1 wherein said second transmission mechanism comprises two screw rods longitudinally mounted on said platform at the bottom, two screw nuts respectively threaded onto said screw rods and fixedly fastened to either end of said rail, a motor, a transmission gear box having a transmission rod coupled between said screw rods by bevel gears, an electromagnetic clutch controlled to couple said motor and said transmission gear box, said rail being carried by said screw nuts to move along said screw rods when said screw rods are turned by said motor through said transmission gear box.

4. The seedlings transplanting machine of claim 1 wherein said first transmission mechanism comprises a driving cylinder, a rack fixedly fastened to said sliding frame, a pawl engaged with said rack and reciprocated by said driving cylinder to move said rack in either direction along said rail, spring means having one end fastened to said pawl and an opposite end fastened to said platform, two stop frames mounted on said rails at two opposite ends to limit the moving range of said rack.

5. The seedlings transplanting machine of claim 1 wherein said movable sleeve driving mechanism of said seedling drop unit comprises two driving cylinders disposed at two opposite sides by said movable sleeve of said seedling drop unit, two accelerating levers respectively connected between said movable sleeve of said seedlings drop unit and a bracket for mounting said driving cyclinders and driven by said driving cylinders to reciprocate said movable sleeve vertically, and a spring means for urging said movable sleeve downwards.

6. The seedlings transplanting machine of claim 1 wherein said movable sleeve driving mechanism of said seedling drop unit comprises two levers of first-order lever disposed at two opposite sides relative to said movable sleeve and having each a first end pivoted to said movable sleeve and a second end coupled with a roller, two spring means having each one end suspended from said platform and an opposite end connected to the second end of either lever, a driving device, and two cams mounted on said machine base at two opposite locations and turned by said driving device to pass through the roller of either lever to cause said levers to oscillate.

7. The seedlings transplanting machine of claim 6 wherein said driving device is an electromagnetic device.

* * * * *